United States Patent
Wu et al.

(10) Patent No.: US 11,914,600 B2
(45) Date of Patent: Feb. 27, 2024

(54) MULTIPLE SEMANTIC HYPOTHESES FOR SEARCH QUERY INTENT UNDERSTANDING

(71) Applicant: Microsoft Technology Licensing, LLC, Redmond, WA (US)

(72) Inventors: Ming Wu, Kirkland, WA (US); Yong Ni, Bothell, WA (US); Guo Mei, Lynnwood, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/363,208

(22) Filed: Jun. 30, 2021

(65) Prior Publication Data

US 2023/0004568 A1 Jan. 5, 2023

(51) Int. Cl.
*G06F 16/2457* (2019.01)
*G06N 20/00* (2019.01)
*G06N 5/04* (2023.01)

(52) U.S. Cl.
CPC ....... *G06F 16/24578* (2019.01); *G06N 5/041* (2013.01); *G06N 20/00* (2019.01)

(58) Field of Classification Search
CPC ........ G06N 5/022; G06N 20/00; G06F 40/30; G06F 16/3329
See application file for complete search history.

(56) References Cited

U.S. PATENT DOCUMENTS

| | | | |
|---|---|---|---|
| 10,453,117 B1 * | 10/2019 | Reavely | G06F 40/30 |
| 10,600,406 B1 | 3/2020 | Shapiro et al. | |
| 11,455,987 B1 * | 9/2022 | Dabas | G06F 3/167 |
| 2014/0278369 A1 | 9/2014 | Cassimatis et al. | |
| 2015/0026153 A1 | 1/2015 | Gupta et al. | |
| 2015/0332673 A1 | 11/2015 | Li et al. | |
| 2016/0357851 A1 | 12/2016 | Perkins et al. | |
| 2018/0032901 A1 | 2/2018 | Chowdhury et al. | |

(Continued)

FOREIGN PATENT DOCUMENTS

WO 2017143338 A1 8/2017

OTHER PUBLICATIONS

"International Search Report and Written Opinion Issued in PCT Application No. PCT/US22/029728", dated Jul. 8, 2022, 14 Pages.

(Continued)

*Primary Examiner* — Hau H Hoang
(74) *Attorney, Agent, or Firm* — SHOOK, HARDY & BACON L.L.P.

(57) ABSTRACT

Examples of the present disclosure describe systems and methods for generating multiple semantic hypotheses for search query intent understanding. In aspects, a search query may be received by a query analysis component associated with a search system. The query analysis component may be used to evaluate the search query for ambiguity in the domain, intent, and/or slot(s) of the search query. A set of hypotheses representing for one or more combinations of the domain, intent, and/or slot(s) of the search query may be generated. The set of hypotheses may be scored and/or ranked. Based on the scores/ranks, one or more of the hypotheses in the set of hypotheses may be provided to a user and/or one or more processing components accessible to the search system.

20 Claims, 8 Drawing Sheets

(56) References Cited

U.S. PATENT DOCUMENTS

2020/0257712 A1    8/2020  Singh et al.
2020/0320988 A1*  10/2020  Rastogi ................... G10L 15/18

OTHER PUBLICATIONS

Winnemöller, Ronald, "Semantic Enterprise Search (but no Web 2.0)", In Journal of Polibits, vol. 39, Mar. 17, 2009, 7 Pages.
Xu, et al., "Understanding the Semantic Intent of Domain-Specific Natural Language Query", In Proceedings of the Sixth International Joint Conference on Natural Language Processing, Oct. 14, 2013, pp. 552-560.

* cited by examiner

MULTIPLE SEMANTIC HYPOTHESES FOR SEARCH QUERY INTENT UNDERSTANDING

BACKGROUND

Search query analysis is a challenging problem in many search systems. Query understanding, in particular, is one of the most challenging issues with search query analysis due to the limited amount of information available at the early stages of a search query analysis. The limited availability of information during the early stages often causes the intent of many search queries to be ambiguous. Additionally, many traditional search systems create and analyze only a single semantic hypothesis for a received search query. For at least these reasons, the search results provided by those search systems may be suboptimal or undesirable to the user.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for generating multiple semantic hypotheses for search query intent understanding. In aspects, a search query may be received by a query analysis component associated with a search system. The query analysis component may be used to evaluate the search query for ambiguity in the domain, intent, and/or slot(s) of the search query. A set of hypotheses representing for one or more combinations of the domain, intent, and/or slot(s) of the search query may be generated. The set of hypotheses may be scored and/or ranked. Based on the scores/ranks, one or more of the hypotheses in the set of hypotheses may be provided to a user and/or one or more processing components accessible to the search system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
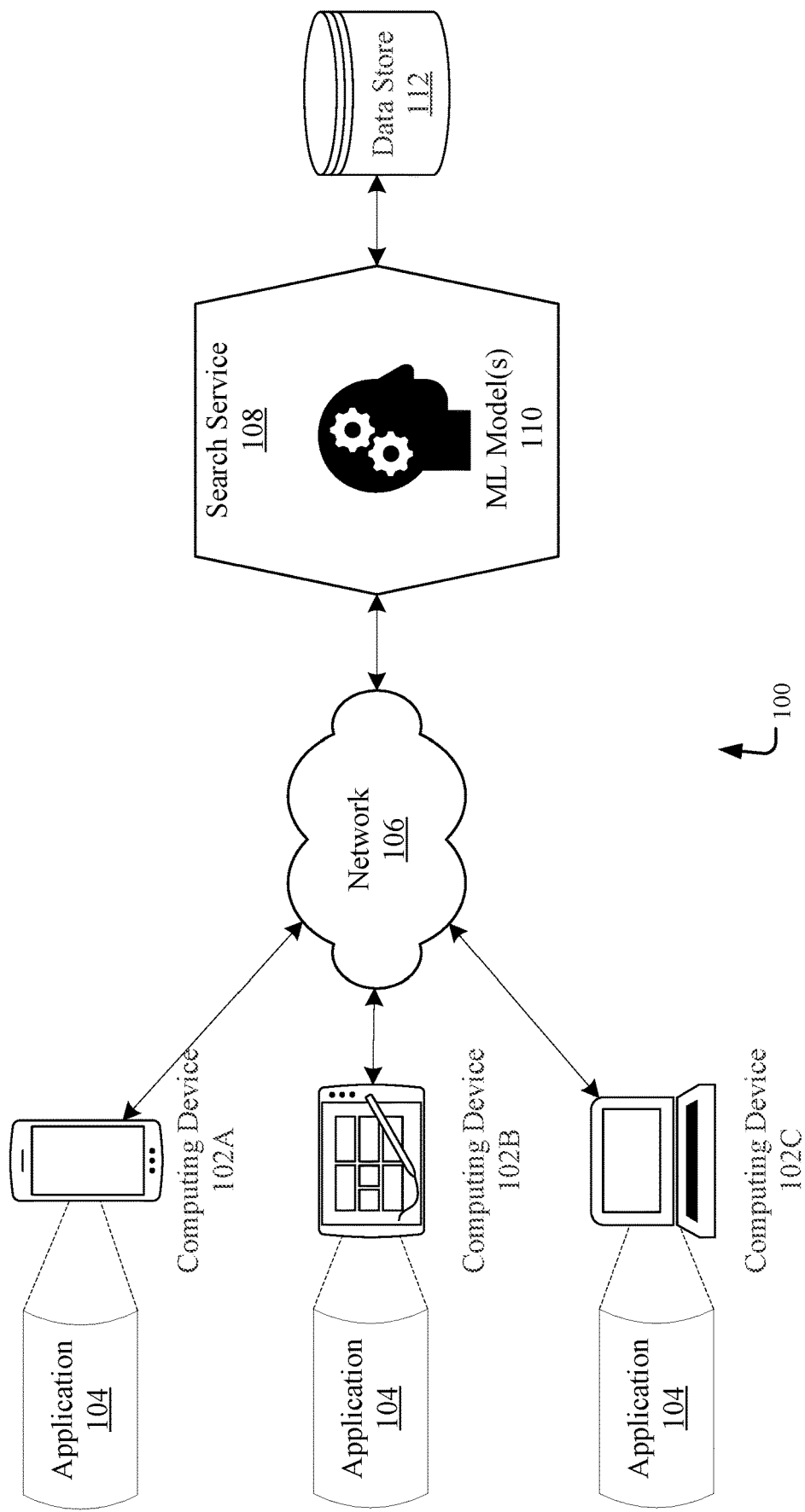
FIG. 1 illustrates an overview of an example system for generating multiple semantic hypotheses for search query intent understanding.

Many traditional search systems utilize one or more intelligence components to perform search query analysis. A query understanding component is one of these intelligence components and provides semantic analysis of a received search query. One of the most challenging issues with performing query understanding is detecting and resolving search query ambiguity. Detecting search query ambiguity is often difficult using traditional search systems due to the limited amount of information available at the early stages of search query analysis. As one example, a search query may be ambiguous due to short and unstructured query formatting that lacks semantic context. For instance, the search query "Washington plan" is ambiguous as to whether "Washington" refers to a person or a location, and whether "plan" refers to a document, a project, or something else. As another example, a search query may be ambiguous due to grammatical ambiguity. For instance, the search query "Find documents from Julian Alexander" is ambiguous as to whether the search query refers to two people (e.g., "Julian" and "Alexander") or only one person. As yet another example, a query or request may be ambiguous due to situational ambiguity. For instance, the query "Share the presentation" is ambiguous as to whether the query refers to displaying the presentation on a display screen or to sending the presentation to a recipient.

The difficulty of detecting search query ambiguity using traditional search systems is exacerbated in enterprise systems, which often incorporate a personalized and contextualized content index comprising data specific to the enterprise and/or to one or more members of the enterprise. Ambiguity is exacerbated because the enterprise content index may comprise terms/concepts that are in conflict with terms/concepts in data sources that are not specific to (or controlled by) the enterprise. As one example, a search query may be ambiguous due to the inherent ambiguity of personalized content. For instance, the search query "NFL" is ambiguous as to whether "NFL" refers to an enterprise-agnostic term/concept (e.g., "National Football League") or to an enterprise-specific term/concept (e.g., "Negative Feedback Loop"). Similarly, the search query "Call Greg" is ambiguous as to whether "Greg" refers to a member of the enterprise or to a personal contact of the user (e.g., a non-member of the enterprise).

Another challenging issue with performing query understanding is that many traditional search systems implement an "early binding" approach, where a single hypothesis is generated and selected for a search query prior to evaluating the result data or overall context of the search query. For example, data from a single data source or a single data domain may be used to evaluate a search query. Although the search query may be ambiguous for one or more of the reasons discussed above, a single hypothesis may be generated for the search query. The hypothesis may be based on or limited to the context of the data source or the data domain. For instance, a user having a contact named "August" may enter the search query "August email" into an email application. A search system associated with the email application may determine the context of the search query is "email search" because the search query was received by the email application. Accordingly, the email application data may be searched for instances of or relating to "August." As the only reference (or predominant reference) to "August" may be to a date, a hypothesis in which "August" refers to a date may be generated. The hypothesis may then be used to provide search results comprising a list of emails sent by the user during the month of August. As the user may have intended the search query to retrieve emails sent to or received from the user contact August, the user may be dissatisfied with the search results. Consequently, the user may be required to reformat and re-execute the query, or to use an alternative application or search system to execute the search query. Both of these scenarios waste the user's time and require additional computational processing to occur, which may severely diminish the user experience.

The present disclosure describes systems and methods for generating multiple semantic hypotheses for search query intent understanding. In examples, a search query may be received by a search system implementing a search engine, a search service, or a similar search tool/utility. The search query may be provided to a query analysis component of or associated with the search system. The query analysis component may evaluate the search query to determine whether one or more parts (e.g., domains, intents, and/or slots) of the search query are ambiguous. In examples, a domain may refer to an area of knowledge (e.g., cryptography, cloud computing, artificial intelligence, sports) or a container/boundary that isolates or defines an application, software functionality, or a set of data (e.g., "email" domain, "user contact" domain, "software development" domain). For instance, the search query "Find August emails" may be assigned to the "email" domain. An intent may refer to the goal or an intention of user's search query, request, or other entered input. For instance, the user intent of the search query "Find August emails" may be to view emails from the user August or emails from the month of August. Accordingly, the "find emails" intent may be assigned to the search query. A slot may refer to the actionable content within the search query, request, or other entered input. For instance, the search query term "August" may be assigned to the slot "date" and/or to the slot "user contact." The search query may be evaluated using, for example, a rule-based model or algorithm, a machine learning model or algorithm, or a regular expression. The evaluation may include an analysis of user activity and/or user data associated with one or more applications, services, enterprises, groups, data sources, or entities.

For one or more potential combinations of the search query parts, a hypothesis may be generated. In examples, a hypothesis may represent a potential search query candidate or a statement of user intent for the search query. A hypothesis may comprise one or more domains, intents, and/or slots associated with a search query. A hypothesis may also comprise a confidence score, rating, or label indicating a likelihood that the hypothesis is accurate or is relevant to the search query. A set of the generated hypotheses may be ranked using one or more ranking models or algorithms implemented by or accessible to the query analysis component. One or more of the ranked hypotheses may be provided to a user in response to the search query. Alternatively, one or more of the ranked hypotheses may be provided to one or more processing components accessible to the search system. For example, one or more of the ranked hypotheses may be provided to a processing component, such as an application, a service, or another component that is downstream of the search system. The processing component(s) may generate search results (or additional search results) for the ranked hypotheses. One or more of the search results from the processing component(s) may be merged into a set of search results. The merged set of search results may be provided the user as a response to the search query.

Accordingly, the present disclosure provides a plurality of technical benefits including but not limited to: generating and ranking multiple hypotheses for a search query using a hypothesis ranking algorithm or model, leveraging a wide range of input knowledge during query understanding using an ambiguity detection engine, providing improved intent classification and sequence labeling using a hypothesis generation mechanism, implementing a hypothesis generation mechanism to provide a late-binding approach to query understanding (e.g., multiple potential hypotheses are generated and evaluated based on information from various data sources), using a postprocessing engine to enable downstream components to facilitate query disambiguation, using an ambiguity detection engine to improve search query intent understanding in enterprise environments, using a postprocessing engine to collect user response feedback to improve search query optimization, among other examples.

FIG. 1 illustrates an overview of an example system for generating multiple semantic hypotheses for search query intent understanding. Example system 100 as presented is a combination of interdependent components that interact to form an integrated whole. Components of system 100 may be hardware components or software components (e.g., applications, application programming interfaces (APIs), modules, virtual machines, or runtime libraries) implemented on and/or executed by hardware components of system 100. In one example, components of systems disclosed herein may be implemented on a single processing device. The processing device may provide an operating environment for software components to execute and utilize resources or facilities of such system. An example of one or more processing devices comprising such an operating environment is depicted in FIGS. 4-7. In another example, the components of systems disclosed herein may be distributed across multiple processing devices. For instance, input may be entered on a user device or client device and information may be processed on or accessed from other devices in a network, such as one or more remote cloud devices or web server devices.

In FIG. 1, system 100 comprises user devices 102A, 102B, and 102C (collectively "user device(s) 102"), network 106, search service 108, and data store(s) 112. One of skill in the art will appreciate that the scale and structure of systems such as system 100 may vary and may include additional or fewer components than those described in FIG. 1. As one example, user device(s) 102 may comprise or locally access search service 108 and/or data store(s) 112.

User device(s) 102 may be configured to detect and/or collect input data from one or more users or devices. The input data may correspond to user interaction with one or more software applications or services implemented by, or accessible to, user device(s) 102. The input data may include, for example, voice input, touch input, text-based input, gesture input, video input, and/or image input. The input data may be detected/collected using one or more sensor components of user device(s) 102. Examples of sensors include microphones, touch-based sensors, geolocation sensors, accelerometers, optical/magnetic sensors, gyroscopes, keyboards, and pointing/selection tools. Examples of user device(s) 102 may include, but are not limited to, personal computers (PCs), mobile devices (e.g., smartphones, tablets, laptops, personal digital assistants (PDAs)), wearable devices (e.g., smart watches, smart eyewear, fitness trackers, smart clothing, body-mounted devices, head-mounted displays), and gaming consoles or devices.

User device(s) 102 may comprise or otherwise have access to application(s) 104. Examples of application(s) 104 may include, but are not limited to, word processing applications, spreadsheet application, presentation applications, document-reader software, social media software/platforms, search engines, media software/platforms, multimedia player software, content design software/tools, and database applications. Application(s) 104 may enable users to access and/or interact with one or more types of content, such as text, audio, images, video, animation, and multimedia (e.g., a combination of text, audio, images, video, and/or animation). For instance, application(s) 104 may comprise or have access to a corpus of content sources (e.g., documents, files, applications, services, web content) including various types of content. Application(s) 104 may also enable users to input one or more search queries or requests for search content. As one example, application(s) 104 may enable a user to enter a text-based search query into or select a text-based query from an input element, such as a text field, a radio button, or a dropdown list. In at least one example, application(s) 104 may also enable a user to specify a search query that is not text-based. For instance, the user may provide a search query in the form of image data, audio data, haptic data, gesture data, or some combination thereof using one or more input elements.

Application(s) 104 may provide search query (or cause the search query to be provided to) search system 108 via network 106. For instance, application(s) 104 may provide a "Search" button, a "Find Similar" button/option, or a similar search initiation mechanism. Examples of network 106 may include a private area network (PAN), a local area network (LAN), a wide area network (WAN), and the like. Although network 104 is depicted as a single network, it is contemplated that network 106 may represent several networks of similar or varying types.

Search system 108 may be configured to receive and process search queries received from application(s) 104, user device(s) 102, and/or other computing devices. In examples, search system 108 may be implemented in one or more computing devices, service environments, or applications, including application(s) 104. Example computing devices or service environments may include server devices (e.g., web servers, file servers, application servers, database servers), cloud computing devices/services (e.g., Infrastructure as a Service (IaaS), Platform as a Service (PaaS), Software as a Service (SaaS), Functions as a Service (FaaS)), virtual devices, PCs, or the like. The computing devices may comprise one or more sensor components, as discussed with respect to user device(s) 102. In some examples, search system 108 may comprise or provide access to one or more search mechanisms for retrieving content and/or accessing content sources. Examples of search mechanisms include web search engines, content discovery services, database search engines, and similar content searching utilities.

Search system 108 may comprise or otherwise have access to machine learning model(s) 110. Search system 108 may provide received search queries (or content thereof) to machine learning model(s) 110 as input. In examples, machine learning model(s) 110 may represent a predictive or statistical utility or program that may be used to identify or predict a response value from one or more predictors. A model may be based on, or incorporate, one or more rule sets, machine learning, a neural network, or the like. Machine learning model(s) 110 may be trained to implement query understanding to provide semantic analysis of search queries. The semantic analysis may include detecting ambiguity in a search query, generating one or more hypotheses for the search query, ranking/sorting the hypotheses, and providing a set of ranked/sorted search query results to a user and/or one or more processing components accessible to search system 108. In some examples, machine learning model(s) 110 may access data store(s) 112 during the query understanding process.

Data store(s) 112 may store content from one or more content sources, such as web-based data sources, enterprise-based data sources, and/or user owned or controlled (e.g., personal or private) data sources. As one example, data store(s) 112 may comprise user data (e.g., user account/identification data, user data index, user profile/settings, user knowledge graph, user's stored documents and files) and/or application data (e.g., user activity data, user behavioral history, user contact data, user communication data) relating to the user (or user device) that provided the search query. Machine learning model(s) 110 may use the user data and/or application data as additional information for generating relevant hypotheses for a received search query. As another example, data store(s) 112 may comprise result data and data resources (e.g., documents, services, knowledge graph content, image content, video content) that satisfy or are relevant to the search request. Machine learning model(s) 110 may use the result data and data resources to generate search results for the search query. Examples of data store(s) 112 include, but are not limited to, databases, file systems, file directories, flat files, and virtualized storage systems.

Figure 2:
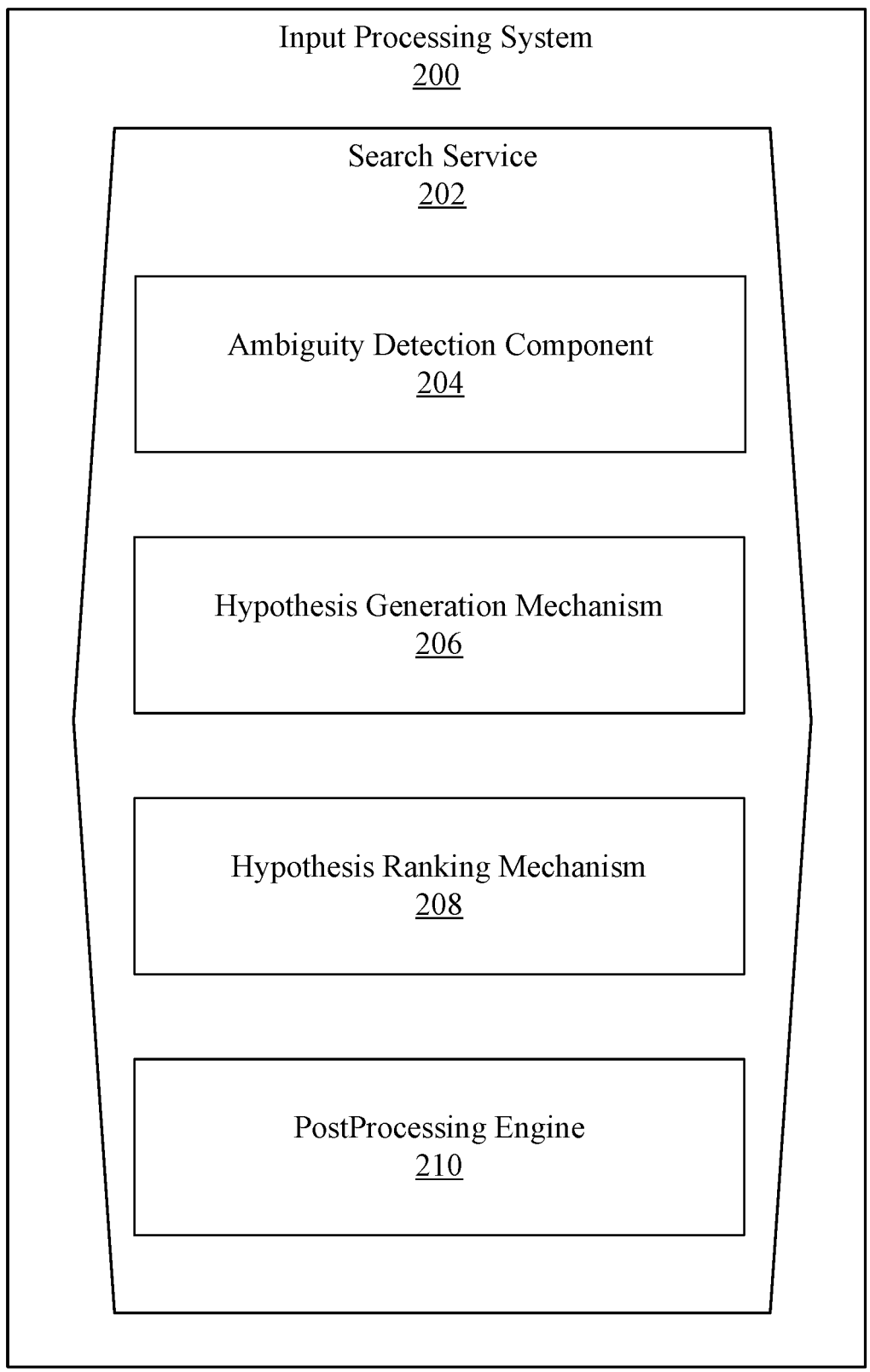
FIG. 2 illustrates an example input processing system for generating multiple semantic hypotheses for search query intent understanding.

FIG. 2 illustrates an example input processing system for generating multiple semantic hypotheses for search query intent understanding. The techniques implemented by input processing system 200 may comprise the techniques and data described in system 100 of FIG. 1. Although examples in FIG. 2 and subsequent figures will be discussed in the context of text content, the examples are equally applicable to other types of content, such as image content, and video content. In some examples, one or more data and components described in FIG. 2 (or the functionality thereof) may be distributed across multiple devices. In other examples, a single device may comprise the data and components described in FIG. 2.

In FIG. 2, input processing system 200 comprises search service 202, search service 202 may be configured to receive and process search queries received from one or more users, applications, computing devices, or computing environments. In examples, search service 202 may be implemented as a standalone service or may be integrated into an application, program, or computing environment, such as an enterprise environment. Search service 202 may comprise ambiguity detection mechanism 204, hypothesis generation mechanism 206, and hypothesis ranking mechanism 208, and postprocessing engine 210. One of skill in the art will appreciate that the scale of input processing system 200 may vary and may include additional or fewer components than those described in FIG. 2. As one example, input processing system 200 may further comprise a search query preprocessing engine, a user interface enabling a user to interact directly with search service 202, and/or one or more data sources comprising various data content and data resources.

As another example, search service 202 may leverage or include one or more traditional language understanding models.

Ambiguity detection mechanism 204 may be configured to detect ambiguity in received search queries (and other received input). Detecting ambiguity may include identifying one or more input signals associated with a search query. Example input signals may include application entry points (e.g., the application detecting and/or providing the search query), user device data (e.g., device identifier, device configuration) personalized context data (e.g., user's personal documents, activity information, and other user data), tenant-level context data (e.g., topics/concepts and acronyms known to an enterprise/organization, document information owned and/or accessible by an enterprise/organization, enterprise knowledge graph information), common world data (e.g., topics/concepts and acronyms known to the general public, publicly accessible documents, resource, and information).

Ambiguity detection mechanism 204 may identify and/or collect the input signals from one or more data sources using data parsing and/or pattern matching techniques. For example, ambiguity detection mechanism 204 may parse the search query into one or more tokens (e.g., terms or phrases). The search query tokens may be used to identify input signals associated with user data, a user device, and/or application data stored by or accessible to input processing system 200. Identifying the input signals may include the use of a rule-based model or algorithm, a machine learning model or algorithm, or a regular expression. For instance, a language understanding (LU) model may evaluate the search query tokens against multiple data sets corresponding to one or more concepts or topics, applications or services, data domains, enterprise segments (e.g., groups or departments), or entities (e.g., enterprises, organizations, countries). The evaluation may comprise matching a search query token to data in a data set.

Ambiguity detection mechanism 204 may use the input signals to determine whether there is ambiguity at the domain level, intent level, and/or slot level of the search query. The determination may comprise determining whether a search query token is identified in multiple data sets, identifying whether a search query token has multiple meanings or contexts in one or more data sets, or identifying synonyms and/or acronyms for a search query token, or identifying usage of a search query token in previous search queries. As a specific example, the search query token "August" may be identified in the "Calendar" data domain, the "Personal Contacts" data domain, and the "Enterprise Contacts" data domain. Based on the input signals for the search query, ambiguity detection mechanism 204 may generate a set of features. The set of features may identify one or more combinations of the domains, intents, and/or slots for one or more search query tokens. For instance, the set of features may indicate that a search query token may indicate a slot referring to a date (e.g., slot:date) or a slot referring to a user contact (e.g., slot:contact_name).

Hypothesis generation mechanism 206 is configured to generate one or more hypotheses for a search query. In examples, hypothesis generation mechanism 206 may receive or otherwise have access to a set of features generated by ambiguity detection mechanism 204. Hypothesis generation mechanism 206 may apply one or more hypothesis modeling techniques to the set of features. As one example, hypothesis generation mechanism 206 may apply a pattern-based approach, in which a semantic pattern of the search query is analyzed to determine whether the search query tokens of the search query match a predefined order or structure. For instance, the most used sentence structure for scheduling a meeting may be determined to be "<Action> <Event> <User> <Time>" (e.g., "<Schedule> a <meeting> with <David> at <noon>"). Hypothesis generation mechanism 206 may determine whether the number and order of the search query tokens matches the four slots (e.g., <Action>, <Event>, <User>, <Time>) of the sentence structure. If a requisite number and/or order of the search query tokens match a predefined order or structure, a hypothesis corresponding to the indicated intent (e.g., scheduling a meeting) may be generated. For instance, if at least three of the four slots match the predefined order/structure, or comprise terms that match, are semantically similar to, or are synonymous with the terms expected for the predefined order/structure, a hypothesis corresponding to the indicated intent of the predefined order/structure may be generated. However, if a requisite number and/or order of the search query tokens do not match the predefined order or structure, a hypothesis corresponding to the indicated intent may not be generated.

As another example, hypothesis generation mechanism 206 may apply a machine learning model, in which a semantic pattern of the search query is analyzed to calculate search query parts (e.g., domain, intent, slot) probabilities based on data domain or data category. For instance, a search query structure in which a preposition is followed by a username may be highly indicative of a first domain, whereas a verb followed by a username may be highly indicative of a second domain. Example machine learning models may include neural networks, decision tree algorithms, logistic regression algorithms, support vector machines (SVM) algorithms, k-nearest-neighbor (KNN) algorithms, Naïve Bayes classifiers, linear regression algorithms, and k-means clustering algorithms, and conditional random field (CRF) models. In some examples, different machine learning models may be used to tag one or more of the search query parts. For instance, a CRF model may be used for slot tagging and a long short-term memory (LSTM) neural network may be used for domain and/or intent tagging.

Hypothesis generation mechanism 206 may generate a hypothesis for one or more features in the set of features. A hypothesis may comprise a combination of domains, intents, and/or slots associated with a feature. As a specific example, the feature "slot:date" may be represented as "domain: calendar, intent:search_calendar, slot:date:<value>." A hypothesis may also comprise a confidence metric (e.g., score, rating, or label) indicating a likelihood that the hypothesis is accurate or is relevant to the search query. The confidence metric may be appended to or otherwise associated with a hypothesis.

Hypothesis ranking mechanism 208 may be configured to rank hypotheses. In examples, hypothesis ranking mechanism 208 may extract one or more features of a hypothesis. The features may be provided to a ranking model/algorithm. Alternatively, the extracted features may be used to construct one or more feature vectors (e.g., an n-dimensional vector of numerical features that represent one or more objects), which may be provided to a ranking/algorithm model. Example ranking models/algorithms may implement pointwise approaches (e.g., Pranking, McRank, Combined Regression and Ranking (CRR)), pairwise approaches (e.g., RankNet, LambdaRank, LambdaMART), and/or listwise approaches (e.g., PermuRank, NDCG Boost, ES-Rank).

Based on the received features (or feature vectors(s)), the ranking model/algorithm may apply weights to and rank the hypotheses. The ranking may be based on one or more factors, such as application/service entry point, application/service context (e.g., whether active and/or in focus, application/service feature being used), user access privileges to data/data sources, historical user behavior, search query tokens, or semantic analysis data for the search query (e.g., likelihood that search query terms would be used in certain ways or orders to confer certain meanings). In some examples, the rankings may be used to modify the confidence metrics of the hypotheses. For instance, the rankings may be added or applied as a weight to the confidence metrics. In other examples, the confidence metrics may be provided to the ranking model as a feature. Accordingly, the rankings may be standalone and/or final values. Hypothesis ranking mechanism 208 may sort the hypotheses according to the rankings. For instance, the hypotheses may be sorted in descending rank order.

Postprocessing engine 210 may be configured to process ranked hypotheses and/or search results. In one example, postprocessing engine 210 may provide one or more of the ranked hypotheses to a user in response to a search query. The ranked hypotheses may be provided as a set of candidate data items (e.g., responses, search queries, data resource links) that may presented in a display order that is consistent with the rankings for the hypotheses. Postprocessing engine 210 may enable a user to select one or more of the candidate data items. The user selection may be used to confirm the user intent of the search query. A search query may be executed and/or search results may be retrieved based on the selected candidate data item. In some examples, the indication of the user selection may be provided to one or more components of search service 202. The indication of the user selection may be used to train or update one or more models or algorithms to optimize search query processing.

In another example, postprocessing engine 210 may provide one or more of the ranked hypotheses to one or more processing components (e.g., applications, services, or computing devices) that are downstream of search service 202. For example, a first ranked hypothesis may be used to retrieve search results from a first application (such as an email application), a second ranked hypothesis may be used to retrieve search results from a second application (such as an enterprise user contact application), and the second ranked hypothesis may be used to retrieve search results from a third application (such as an private user contact list). The search results from the processing components may be provided to postprocessing engine 210. Postprocessing engine 210 may merge the search results of the various processing components into a single set of merged search results. The order of the merged search results may be consistent with the rankings for the hypotheses. For example, the search results corresponding to the highest ranked hypothesis may be arranged first in the merged search results (e.g., at the top of the list of merged search results), the search results corresponding to the second highest ranked hypothesis may be arranged second in the merged search results, and so on. Postprocessing engine 210 may then display the merged search results to the user or provide the merged search results to a user device.

Having described various systems that may be employed by the aspects disclosed herein, this disclosure will now describe one or more methods that may be performed by various aspects of the disclosure. In aspects, method 300 may be executed by a system, such as system 100 of FIG. 1 or input processing system 200 of FIG. 2. However, method 300 is not limited to such examples. In other aspects, method 300 may be performed by a single device or component that integrates the functionality of the components of system 100 and/or input processing system 200. In at least one aspect, method 300 may be performed by one or more components of a distributed network, such as a web service or a distributed network service (e.g. cloud service).

Figure 3:
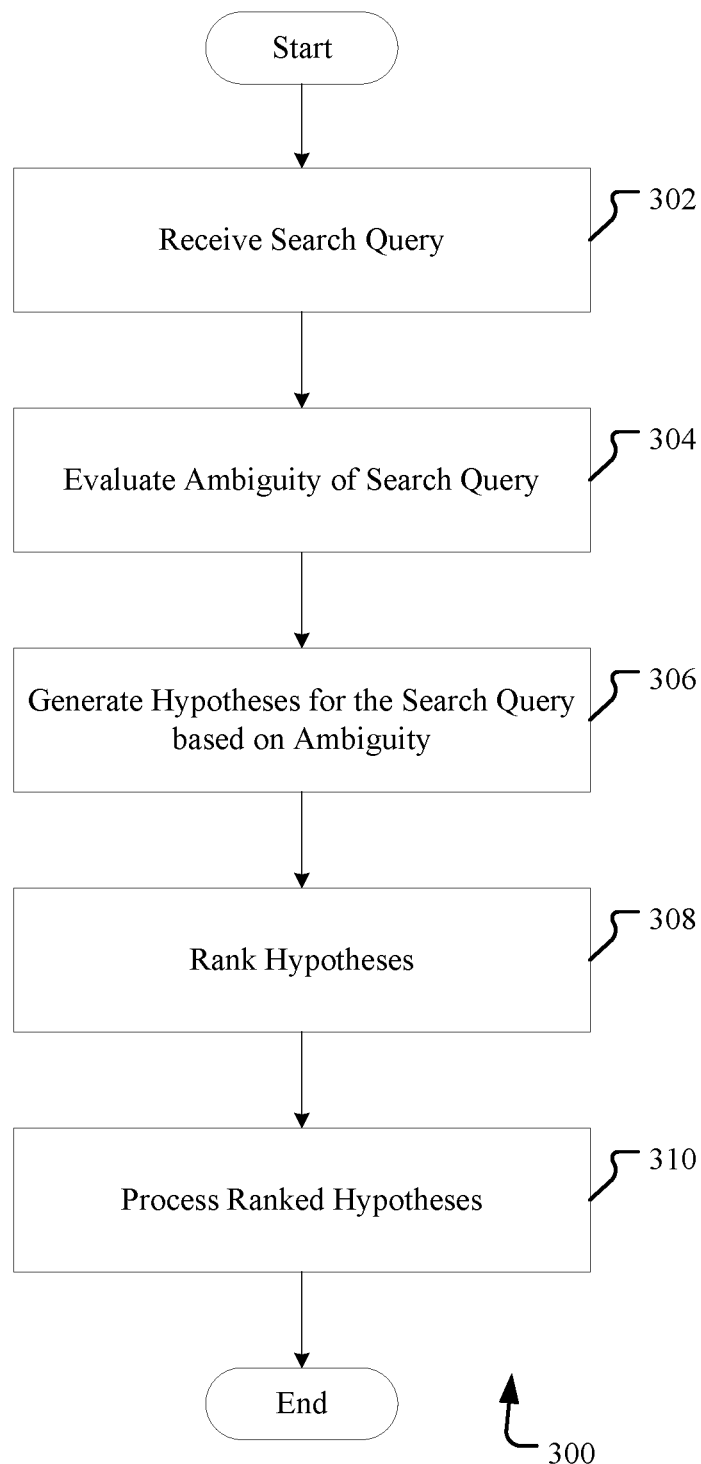
FIG. 3 illustrates an example method for generating multiple semantic hypotheses for search query intent understanding.

FIG. 3 illustrates an example method for generating multiple semantic hypotheses for search query intent understanding. Example method 300 begins at operation 302, where a search query is received. In examples, a search query from a computing device, such as user device(s) 102, may be received by a search service, such as search service 202. The search query may comprise one or more terms, phrases, questions, or statements. The search query may be submitted to the search service by an application accessible to user device(s) 102, such as application(s) 104, or submitted directly to the search service via an exposed interface of the search service. For example, a user may input the search query "August email" into a search service API implemented by an email application. The search service API may provide the search query to the search service.

At operation 304, the ambiguity of the search query may be evaluated. In examples, a received search query may be provided to a query analysis component, such as ambiguity detection mechanism 204. The query analysis component may parse the search query to identify one or more tokens. For instance, the search query "August email" may be parsed into the tokens "August" and "email." The token(s) may be provided to an LU model that uses the token(s) to search one or more data sets or data sources for input signals matching, semantically similar to, or relevant to (e.g., similar topic or concept) the token(s). The searching may include the use of named entity recognition, part-of-speech tagging, automatic summarization, sentiment analysis, and/or similar tasks. The data sets or data sources may comprise user data, user device data, and/or application data corresponding to one or more concepts, topics, applications, services, data domains, enterprise segments (e.g., groups or departments), or entities (e.g., enterprises, organizations, countries).

As a specific example, the query analysis component may search for the tokens "August" and "email" in one or more data sources of a computing environment. Based on the search token "email," the "emailsearch" domain may be identified as relevant to the search query. In response, input signals from an existing LU model associated with the "emailsearch" domain may be identified. The input signals may indicate that the token "August" is recognized as a date in the "emailsearch" domain (e.g., "emailsearch" domain: "<date> August</date> email"). Additionally, based on the search token "August," the user's personalized context data may be identified as relevant to the search query. In response, input signals from the personalized context data (or an LU model associated therewith) may be identified. The input signals may indicate that the token "August" is recognized as a user contact name (e.g., user contact list: ["August", "Ming", "Eric"]).

Based on the input signals identified as relevant to the search query, the query analysis component may generate a set of features that identifies one or more combinations of the domains, intents, and/or slots for one or more of the search query tokens. For instance, in the above example, the token "email" may be tagged as a domain. As ambiguity may not be detected at the domain level (e.g., the token "email" is only relevant, or is most relevant, to the "emailsearch" domain), one corresponding feature may be generated (e.g., "domain:emailsearch"). The token "August" may be tagged as a slot. Due to the ambiguity as to whether the token "August" refers to a data or a contact, two corresponding features may be generated (e.g., "slot:date" and "slot: contact_name").

At operation 306, one or more hypotheses may be generated for the search query. In examples, the set of features generated by the query analysis component may be provided to a hypothesis component, such as hypothesis generation mechanism 206. The hypothesis component may apply one or more hypothesis modeling techniques to the set of features to generate one or more hypotheses. The hypothesis modeling techniques may include a pattern-based approach, in which a semantic pattern of the search query is analyzed to determine whether the search query tokens of the search query match a predefined order or structure. Alternatively, the hypothesis modeling techniques may include the use of a machine learning model, in which a semantic pattern of the search query is analyzed to calculate search query parts probabilities based on data domain or data category.

A generated hypothesis may comprise a structured (or unstructured) combination of domains, intents, and/or slots associated with a corresponding feature. For instance, continuing from the above example, the hypothesis component may determine that the relevant domain for the search query "August email" is the "emailsearch" domain and the intent of the search query is to search for emails. Accordingly, the hypothesis component may generate a hypothesis for each feature in the corresponding set of features. The hypothesis for the interpretation of "August" as a date may be represented as "domain:emailsearch, intent:search_email, slots: [date:August]," and the hypothesis for the interpretation of "August" as a user contact may be represented as "domain: email search, intent:search_email, slots:[contact_name:August]."

The hypothesis component may also generate one or more confidence metrics for the hypotheses, such as a score, a rating, or a label. The confidence metric may indicate a likelihood that a hypothesis is accurate or is relevant to the search query. The confidence metric may be based on the number and/or relevance of input signals associated with the features used to generate a hypothesis. The confidence metric may be also based on additional factors, such as user access level to data or applications, current user context, and historical user activity data. As one example, a hypothesis having a domain that directly matches a search query token may be assigned a higher confidence metric than a hypothesis having a domain that only partially matches a search query.

At operation 308, one or more hypotheses may be ranked. In aspects, the hypotheses generated by the hypothesis component may be provided to a ranking component, such as hypothesis ranking mechanism 208. The ranking component may apply one or more scores or weights to the features of the hypotheses in order to rank the hypotheses. The ranking may indicate the predicted relevance of a hypothesis to the user's intent for the search query. The ranking may be based on one or more factors, such as the number and/or relevance of input signals associated with the features used to generate a hypothesis, hypothesis confidence metrics, application/service entry point, application/service context (e.g., whether active and/or in focus, application/service feature being used), user access privileges to data/data sources, historical user behavior, search query tokens, or semantic analysis data for the search query (e.g., likelihood that search query terms would be used in certain ways or orders to confer certain meanings).

For example, the ranking component may access information indicating that a user has exchanged several communications (e.g., emails, phone call, texts, chat messages) with the user contact August in the last month. The ranking component may also determine that the user was composing an email message to the user contact August when the search query was received by the search service. Based on this information, the ranking component may add or apply a score, weight, or bonus (e.g., +0.25) to the hypothesis interpreting "August" as a user contact (e.g., based on communication recency and current user context). The ranking component may further determine that the month is currently July. Based on this information, the ranking component may subtract or apply a score, weight, or penalty (e.g., −0.10) to the hypothesis interpreting "August" as a date (e.g., based on current world knowledge context (that is, August was 11 months ago)). Accordingly, the ranking component may assign a higher score (e.g., 0.95) to the hypothesis interpreting "August" as a user contact and assign a lower score (e.g., 0.60) to the hypothesis interpreting "August" as a date. As should be appreciated, alternative scoring formats and methods are contemplated.

In some examples, the ranking component may merge the ranked hypotheses into one or more sets of hypotheses. For instance, the ranked hypotheses may be merged into a single set of hypotheses or the ranked hypotheses may be clustered into multiple sets of hypotheses based on domain, intent, query search token, etc. The ranking component may then sort the merged hypotheses based on one or more criterion. For example, the merged hypotheses may be sorted based on hypothesis ranking.

At operation 310, one or more ranked hypotheses may be processed. In aspects, one or more ranked hypotheses may be provided to a postprocessing component, such as postprocessing engine 210. The postprocessing component may provide the ranked hypotheses to a user in response to the search query. In one example, ranked hypotheses may be provided as suggested search queries. For instance, the suggested search queries for the search query "August emails" may be "emails from contact August" and "emails from August $1^{st}$-$31^{st}$." The processing component may also provide search query refinement options (e.g., "emails from August $1^{st}$-$15^{th}$" and "emails from August $16^{th}$-$31^{st}$") and/or related search queries (e.g., "emails from contact Augustine," "email attachments from contact August," "meetings scheduled during August $1^{st}$-$31^{st}$").

The postprocessing component may also provide the ranked hypotheses to one or more processing components (e.g., applications, services, or computing devices). The ranked hypotheses may be used to retrieve search results from the processing components. For example, a supplemental search query that is formulated from a first hypothesis may be provided to a first application (such as an email application) and a supplemental search query that is formulated from a second hypothesis may be provided to a second application (such as an user contact application). The postprocessing component may receive the search results from the processing components and may merge the search into a single set of merged search results. The merged search results may then be provided to a user in response to the search query. For instance, the search results for the search query "August emails" may comprise emails from the user contact August and emails from August $1^{st}$-$31^{st}$ emails. The search results may be merged into a single search result set and provided to a user. The presentation order of the merged search results may depend on the ranking order of the respective hypotheses.

FIGS. 4-7 and the associated descriptions provide a discussion of a variety of operating environments in which aspects of the disclosure may be practiced. However, the devices and systems illustrated and discussed with respect to FIGS. 4-7 are for purposes of example and illustration and are not limiting of a vast number of computing device configurations that may be utilized for practicing aspects of the disclosure, described herein.

Figure 4:
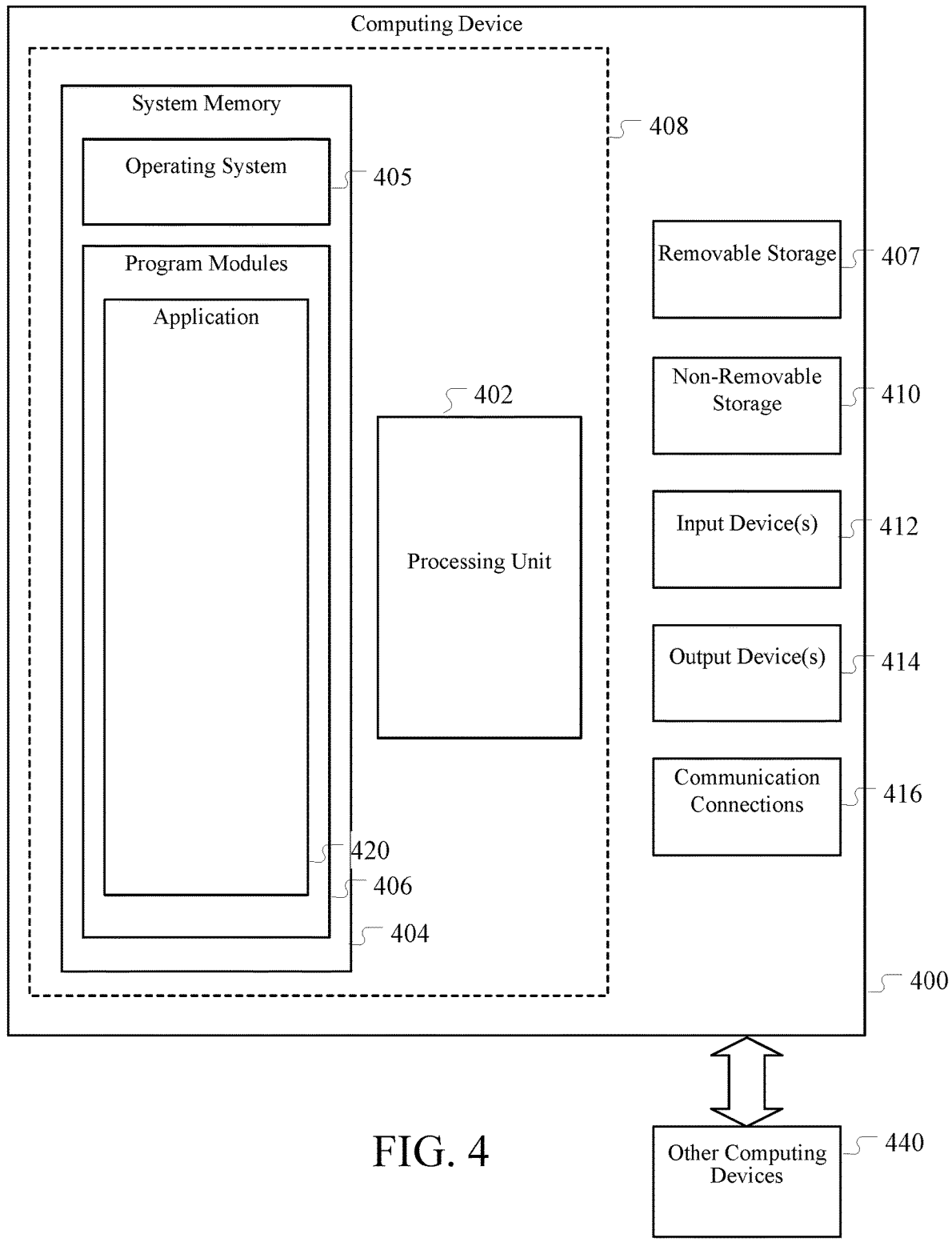
FIG. 4 is a block diagram illustrating example physical components of a computing device with which aspects of the disclosure may be practiced.

FIG. 4 is a block diagram illustrating physical components (e.g., hardware) of a computing device 400 with which aspects of the disclosure may be practiced. The computing device components described below may be suitable for the computing devices and systems described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories.

The system memory 404 may include an operating system 405 and one or more program modules 406 suitable for running software application 420, such as one or more components supported by the systems described herein. The operating system 405, for example, may be suitable for controlling the operation of the computing device 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 440. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
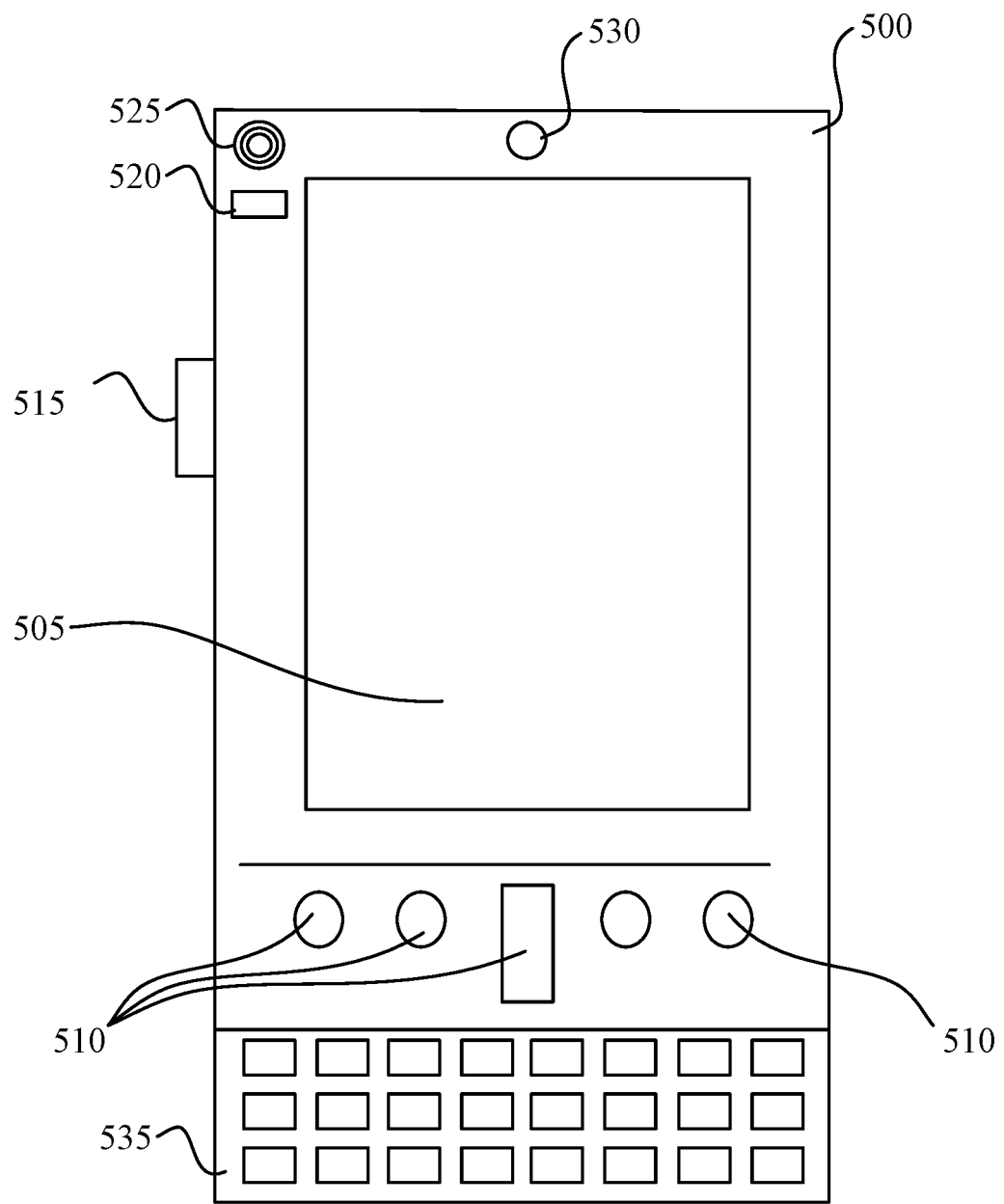
FIGS. 5A and 5B are simplified block diagrams of a mobile computing device with which aspects of the present disclosure may be practiced.
Figure 5B:
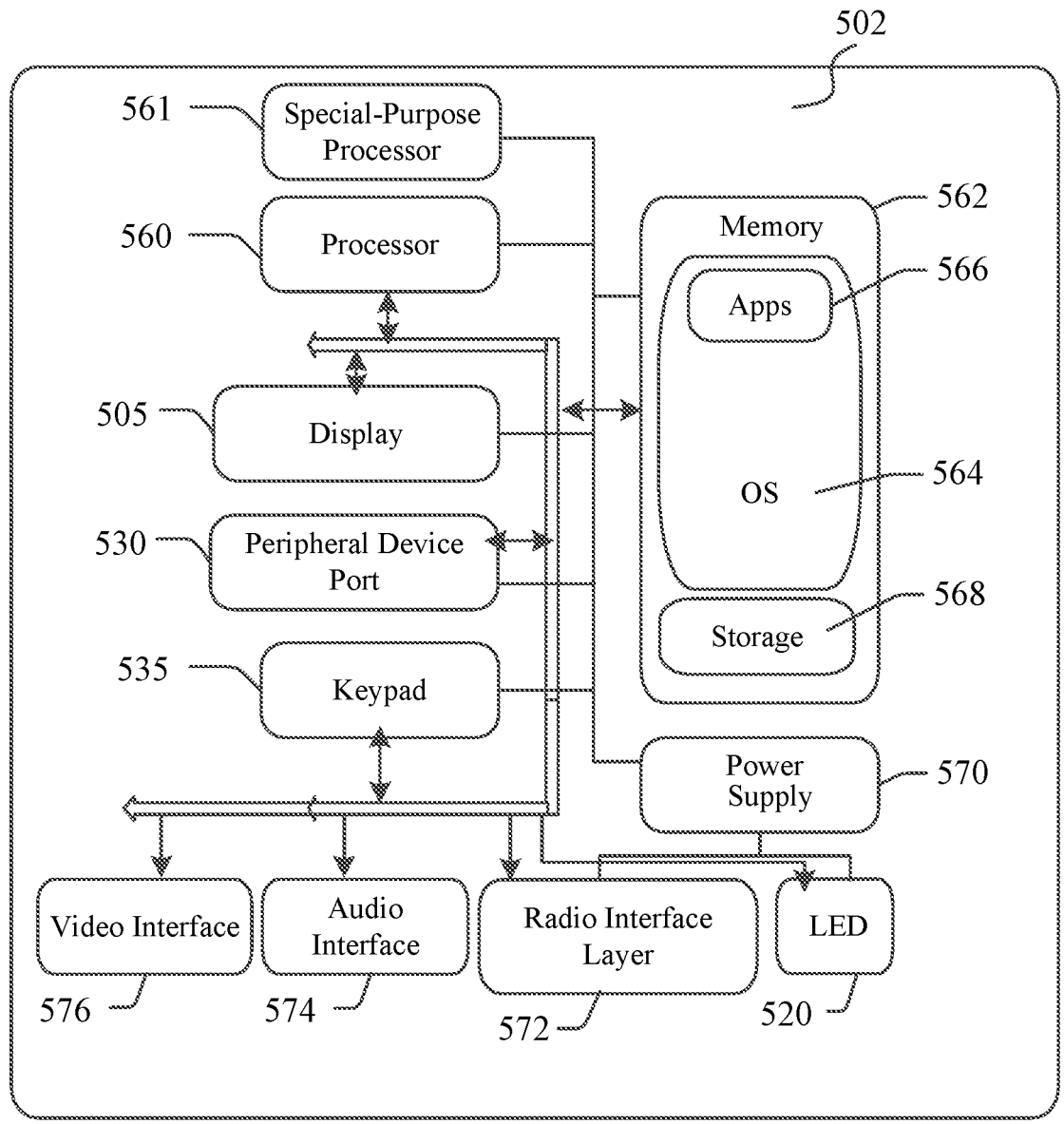

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display).

If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments.

In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display.

In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500 described herein (e.g., search engine, extractor module, relevancy ranking module, answer scoring module).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor(s) (e.g., processor 560 and/or special-purpose processor 561) and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

Figure 6:
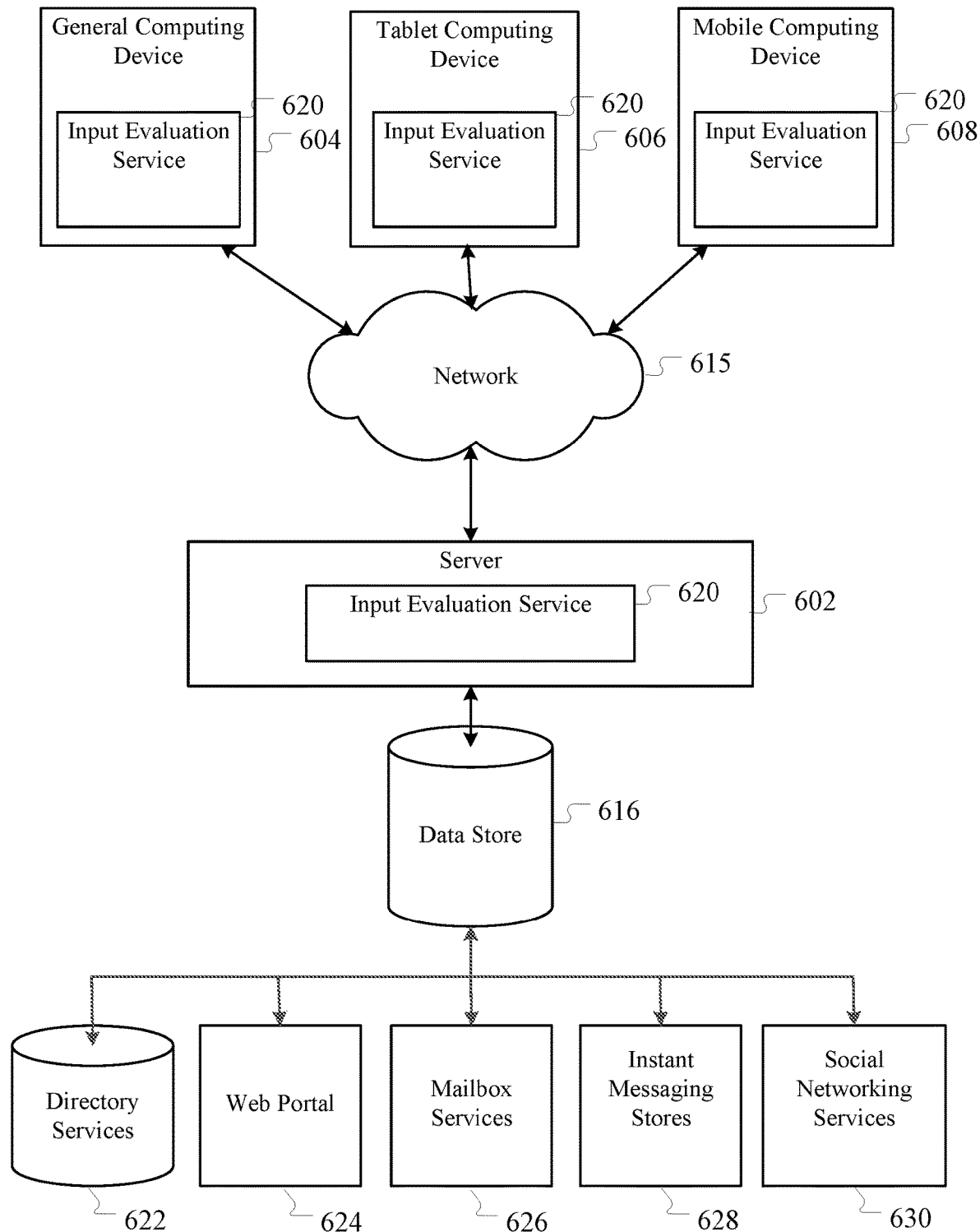
FIG. 6 is a simplified block diagram of a distributed computing system in which aspects of the present disclosure may be practiced.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630.

An input evaluation service 620 may be employed by a client that communicates with server device 602, and/or input evaluation service 620 may be employed by server device 602. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

Figure 7:
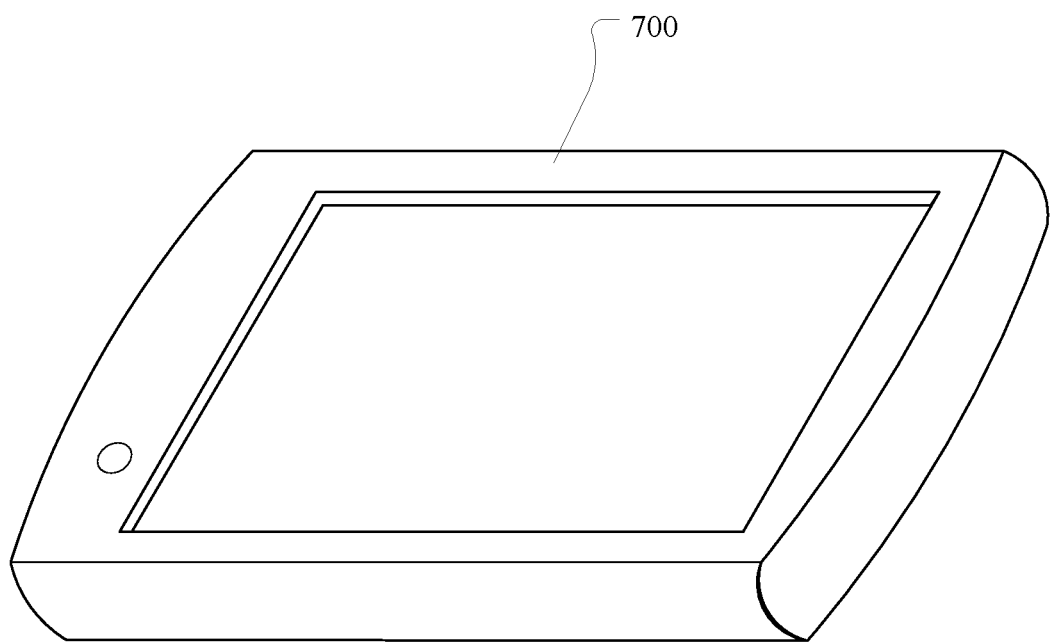
FIG. 7 illustrates a tablet computing device for executing one or more aspects of the present disclosure.

FIG. 7 illustrates an exemplary tablet computing device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processor; and
memory coupled to the processor, the memory comprising computer executable instructions that, when executed by the processor, performs a method comprising:
receiving a search query from a user;
identifying one or more tokens in the search query;
identifying one or more input signals associated with the one or more tokens, at least one input signal comprising an indication of an application entry point or a user access privilege;
generating a set of features using the one or more input signals;
generating one or more hypotheses based on the set of features, wherein the one or more hypotheses respectively represent a search query candidate for the search query and respectively comprise one or more of a domain, an intent, or a slot, wherein:
the domain indicates an area of knowledge or a data boundary;
the intent indicates a goal or an intention of the search query; and
the slot indicates actionable content within the search query;
ranking the one or more hypotheses based on at least the one or more input signals and a score assigned to a feature of the set of features of the one or more hypotheses, the score determined based on the least one input signal; and
processing the one or more ranked hypotheses.

2. The system of claim 1, wherein identifying the one or more input signals associated with the one or more tokens comprises:
determining at least one of:
the one or more tokens match one or more terms in the one or more input signals;
the one or more tokens are similar to one or more terms in the one or more input signals; or
the one or more tokens are relevant to one or more terms in the one or more input signals.

3. The system of claim 1, wherein generating the set of features further comprises formatting the one or more input signals into a structured format defining one or more of the domain, the intent, or the slot.

4. The system of claim 1, wherein the one or more hypotheses are generated using a pattern based approach that analyzes a semantic pattern of the search query to determine whether the one or more tokens match a predefined order or structure.

5. The system of claim 4, wherein:
when it is determined that the one or more tokens match the predefined order or structure, a hypothesis corresponding to an intent of the predefined order or structure is generated; and
when it is determined that the one or more tokens do not match the predefined order or structure, the hypothesis corresponding to the intent of the predefined order or structure is not generated.

6. The system of claim 1, wherein the one or more hypotheses are generated using a machine learning model that analyzes a semantic pattern of the search query to calculate search query parts probabilities based on data domain or data category.

7. The system of claim 1, wherein the one or more hypotheses further respectively comprise a confidence metric indicating a likelihood that a hypothesis is accurate or relevant to the search query.

8. The system of claim 7, wherein the confidence metric is based on at least one of: a number of the one or more input signals or a relevance of the one or more input signals.

9. The system of claim 1, wherein ranking the one or more hypotheses comprises applying a second to a second feature of the set of features of the one or more hypotheses.

10. The system of claim 1, wherein ranking the one or more hypotheses comprises generating one or more rankings based on at least one of:
an service entry point;
an application context;
user access privileges.

11. The system of claim 1, wherein ranking the one or more hypotheses comprises generating one or more rankings based on at least one of:
historical user behavior;
the one or more tokens; or
a semantic analysis data for the search query.

12. The system of claim 1, wherein processing the one or more ranked hypotheses comprises providing the one or more ranked hypotheses as suggested search queries.

13. The system of claim 12, wherein processing the one or more ranked hypotheses further comprises providing at least one of:
refinement options for the search query; or
related search queries.

14. The system of claim 1, wherein processing the one or more ranked hypotheses comprises:
formulating one or more supplemental search queries;
providing the one or more supplemental search queries to one or more processing components; and
receiving search results for the search query from the one or more processing components.

15. The system of claim 14, wherein respective search results from at least two of the one or more processing components are merged into merged search results and provided as a response to the search query.

16. The system of claim 15, wherein a presentation order of the merged search results is based on rankings of the one or more hypotheses.

17. A computer-implemented method comprising:
identifying, using a language understanding model, one or more tokens in a search query;
identifying one or more input signals associated with the one or more tokens, at least one input signal comprising an indication of an application entry point or a user access privilege;
generating a set of features using the one or more input signals;
generating one or more hypotheses based on the set of features, wherein the one or more hypotheses respectively represent a search query candidate for the search query and respectively comprise one or more of a domain, an intent, or a slot, wherein:
the domain indicates an area of knowledge or a data boundary;
the intent indicates a goal or an intention of the search query; and
the slot indicates actionable content within the search query;
ranking, using a ranking model, the one or more hypotheses based on at least the one or more input signals and a score assigned to a feature of the set of features of the one or more hypotheses, the score determined based on the least one input signal; and
processing the one or more ranked hypotheses.

18. The method of claim 17, wherein the one or more input signals comprise at least two of:
personalized context data;
tenant-level context data; and
common world data.

19. The method of claim 17, wherein:
the one or more hypotheses further respectively comprise a second score; and
rankings for the one or more hypotheses are based at least in part on the first score and the second score.

20. A device comprising:
a processor; and
memory coupled to the processor, the memory comprising computer executable instructions that, when executed by the processor, performs a method comprising:
receiving a search query;
identifying one or more tokens in the search query;
identifying one or more input signals associated with the one or more tokens, at least one input signal comprising an indication of an application entry point or a user access privilege;
generating a set of features using the one or more input signals;
generating one or more hypotheses based on the set of features, wherein the one or more hypotheses respectively represent a search query candidate for the search query and respectively comprise one or more of a domain, an intent, or a slot, wherein:
the domain indicates an area of knowledge or a data boundary;
the intent indicates a goal or an intention of the search query; and
the slot indicates actionable content within the search query;
ranking the one or more hypotheses based on at least the one or more input signals and a score assigned to a feature of the set of features of the one or more hypotheses, the score determined based on the least one input signal; and
processing the one or more ranked hypotheses.

* * * * *